(12) United States Patent
Matsuda et al.

(10) Patent No.: US 12,148,934 B2
(45) Date of Patent: Nov. 19, 2024

(54) METAL COMPOSITE OXIDE AND PRODUCTION METHOD THEREOF, AND ELECTRODE FOR SOLID OXIDE FUEL CELL

(71) Applicant: SAKAI CHEMICAL INDUSTRY CO., LTD., Osaka (JP)

(72) Inventors: Hironao Matsuda, Osaka (JP); Minoru Yoneda, Osaka (JP); Norimune Hirata, Osaka (JP); Kazuya Miyasaka, Osaka (JP)

(73) Assignee: SAKAI CHEMICAL INDUSTRY CO., LTD., Osaka (JP)

( * ) Notice: Subject to any disclaimer, the term of this patent is extended or adjusted under 35 U.S.C. 154(b) by 680 days.

(21) Appl. No.: 17/440,506

(22) PCT Filed: Mar. 17, 2020

(86) PCT No.: PCT/JP2020/011745
§ 371 (c)(1),
(2) Date: Sep. 17, 2021

(87) PCT Pub. No.: WO2020/196101
PCT Pub. Date: Oct. 1, 2020

(65) Prior Publication Data
US 2022/0173410 A1    Jun. 2, 2022

(30) Foreign Application Priority Data

Mar. 25, 2019 (JP) .................... 2019-057298

(51) Int. Cl.
| H01M 4/90 | (2006.01) |
|---|---|
| H01M 4/88 | (2006.01) |
| H01M 8/1213 | (2016.01) |
| H01M 8/12 | (2016.01) |

(52) U.S. Cl.
CPC ....... *H01M 4/9033* (2013.01); *H01M 4/8825* (2013.01); *H01M 4/8882* (2013.01); *H01M 8/1213* (2013.01); *H01M 2008/1293* (2013.01)

(58) Field of Classification Search
CPC ............ H01M 4/9033; H01M 4/8825; H01M 4/8882; H01M 8/1213
USPC ........................................................ 429/482
See application file for complete search history.

(56) References Cited

U.S. PATENT DOCUMENTS

| 2012/0021330 A1 | 1/2012 | Kobayashi et al. |
| 2018/0287178 A1* | 10/2018 | Liu .................. H01M 4/8803 |
| 2018/0375114 A1 | 12/2018 | Higashino et al. |

FOREIGN PATENT DOCUMENTS

| CN | 101128395 A | 2/2008 |
| CN | 101359739 A | 2/2009 |

(Continued)

OTHER PUBLICATIONS

Yee et al. Additive Manufacturing of 3D Architected Multifuncional Metal Oxides. Adv. Mater., vol. 31, 2019. Retrieved from <URL: https://onlinelibrary.wiley.com/doi/epdf/10.1002/adma.201901345> (Year: 2019).*

(Continued)

*Primary Examiner* — James M Erwin
(74) *Attorney, Agent, or Firm* — Stinson LLP

(57) ABSTRACT

A method for producing a metal composite oxide, the method including steps of: preparing a slurry by mixing different kinds of metal compounds in a powder form, a dispersion medium, and a dispersant, and baking the different kinds of metal compounds after the dispersion medium in the slurry is removed. The slurry further includes a polyalkylene oxide having a viscosity average molecular weight of 150,000 or more. The slurry has a viscosity of 10 mPa·s to 2000 mPa·s, the viscosity being measured using a (Continued)

B-type viscometer under conditions of a temperature of 23° C. to 27° C. and a rotation rate of 60 rpm. According to the production method, a slurry in which different kinds metal compound powders are uniformly dispersed and a precipitate is unlikely to be formed can be obtained. Therefore, a metal composite oxide having a desired composition can be obtained.

13 Claims, 1 Drawing Sheet

(56) References Cited

FOREIGN PATENT DOCUMENTS

| | | |
|---|---|---|
| CN | 101989664 A | 3/2011 |
| CN | 102066263 A | 5/2011 |
| CN | 103872342 A | 6/2014 |
| CN | 108370041 A | 8/2018 |
| JP | H0812329 A | 1/1996 |
| JP | 2009-035447 A | 2/2009 |
| JP | 2012043774 A | 3/2012 |
| JP | 2012-138256 A | 7/2012 |
| JP | 2013004455 A | 1/2013 |
| JP | 2014162703 A | 9/2014 |
| TW | 201319004 A | 5/2013 |

OTHER PUBLICATIONS

International Search Report for PCT/JP2020/011745, dated Jun. 23, 2020, 10 pages.

Li, Daguang, Zhang, Hongyi, Zhang, Hefeng, Huo Qingquan, Cao Mingche, "Progress in Research and Application of Perovskite Composite Oxides", China Academic Journal Electronic Publishing House, 1994-2002, 4 pages.

* cited by examiner

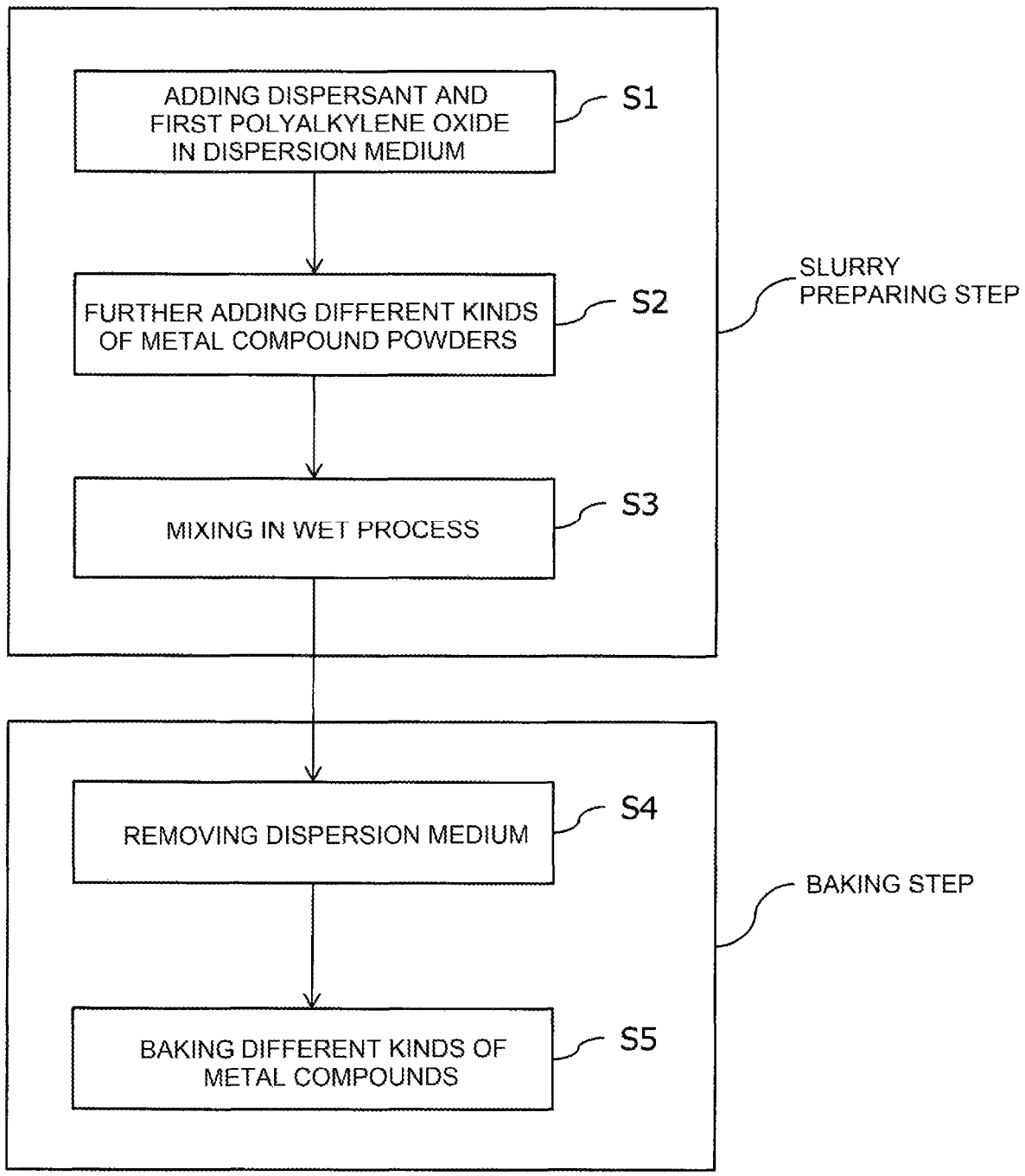

METAL COMPOSITE OXIDE AND PRODUCTION METHOD THEREOF, AND ELECTRODE FOR SOLID OXIDE FUEL CELL

REFERENCE TO RELATED APPLICATIONS

This application is a U.S. national stage application of International Patent Application No. PCT/JP2020/011745, filed Mar. 17, 2020, which claims the benefit of Japanese Patent Application No. 2019-057298, filed Mar. 25, 2019, the entire disclosures of which are incorporated herein by reference.

TECHNICAL FIELD

The present invention relates to a metal composite oxide and a method for producing the same, and an electrode for a solid oxide fuel cell.

BACKGROUND ART

Fuel cells have been increasingly attracting attention in recent years as a clean energy source. In particular, a solid oxide fuel cell (SOFC) using an ion-conductive solid oxide as an electrolyte is excellent in power generation efficiency. The SOFC operates at a temperature as high as about 700° C. to 1000° C. and can use the exhaust heat. Moreover, the SOFC can operate with various fuels, such as hydrocarbon and carbon monoxide gas, and is therefore expected to be widely used from household applications to large-scale power generation applications. The SOFC usually includes an air electrode (cathode) and a fuel electrode (anode) serving as electrodes, and an electrolyte layer interposed therebetween.

The air electrode is formed of, for example, a metal composite oxide. The metal composite oxide can be synthesized from a mixture of different kinds of raw materials by a citric acid method, a solid phase method, and the like. Patent Literature 1 teaches a method of synthesizing a metal composite oxide by a citric acid method. Patent Literature 2 teaches a method of synthesizing a metal composite oxide by a solid phase method.

A typical solid phase method uses, as raw materials, different kinds of metal compounds, such as a metal oxide and a metal carbonate, each in a powder form. For the purpose of improving the uniformity, these metal compound powders are usually dispersed in a dispersion medium, into a slurry, and then subjected to a solid phase method.

Patent Literature 3, relating to a perovskite oxide synthesized by a solid phase method, teaches a method of narrowing the distribution of the value obtained by dividing the molar concentration of the metal contained in the A site by the molar concentration of the metal contained in the B site.

CITATION LIST

Patent Literature

[PTL 1] Japanese Laid-Open Patent Publication No. 2012-138256
[PTL 2] Japanese Laid-Open Patent Publication No. 2009-035447
[PTL 3] Japanese Laid-Open Patent Publication No. 2013-4455

SUMMARY OF INVENTION

Technical Problem

In the slurry, the powders of different kinds of metal compounds are dispersed in various states. For example, particles having a high specific gravity and a large particle diameter, because of the high settling speed, tends to easily separate from the dispersion medium and settle down. Depending on the kind of the metal compound, aggregation may occur, to form a hard precipitate that is difficult to be re-dispersed. Thus, the ratio between the metal compounds contained in the slurry may vary locally, and as a result, a metal composite oxide having a desired composition may become difficult to obtain.

Solution to Problem

In view of the above, one aspect of the present invention relates to a method for producing a metal composite oxide, the method including steps of: preparing a slurry by mixing different kinds of metal compounds in a powder form, a dispersion medium, and a dispersant, and baking the different kinds of metal compounds after the dispersion medium in the slurry is removed, wherein the slurry further includes a polyalkylene oxide having a viscosity average molecular weight of 150,000 or more.

Another aspect of the present invention relates to a metal composite oxide represented by a following general formula:

$$A1_{1-x}A2_{x}BO_{3-\delta},$$

where the element A1 is at least one selected from the group consisting of La and Sm, the element A2 is at least one selected from the group consisting of Ca, Sr, and Ba, the element B is at least one selected from the group consisting of Mn, Fe, Co, and Ni, $0<x<1$, and the $\delta$ is an oxygen deficiency amount, the metal composite oxide having a perovskite-type crystal structure, wherein a standard deviation of values determined at 10 random spots by dividing a molar concentration $M_A$ of a total of the element A1 and the element A2 by a molar concentration $M_B$ of the element B is 0.1 or less.

Yet another aspect of the present invention relates to an electrode for a solid oxide fuel cell, the electrode including the above-described metal composite oxide.

Advantageous Effects of Invention

According to the production method of the present invention, a slurry in which different kinds metal compound powders are uniformly dispersed and a precipitate is unlikely to be formed can be obtained. Therefore, a metal composite oxide having a desired composition can be obtained.

According to the metal composite oxide of the present invention, an electrode having high adhesion to other layers can be obtained.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWING

FIG. 1 A flowchart of an example of a production method according to an embodiment of the present invention.

DESCRIPTION OF EMBODIMENTS

[Method for Producing Metal Composite Oxide]

In preparing a slurry, a dispersant is indispensable for a lower viscosity and a higher concentration. Even when a dispersant is added, however, depending on the kind, the metal compound may settle, and furthermore, may form a precipitate. According to the present embodiment, by using a dispersant in combination with a specific polymeric organic compound, a lower viscosity and a higher concentration attributed by the dispersant can be achieved, and the formation of a precipitate containing the metal compound can be suppressed. This makes it possible to form a slurry in which different kinds of metal compounds are uniformly dispersed in a desired ratio. From this slurry, a metal composite oxide having a desired composition can be obtained. In addition, since the formation of a precipitate can be suppressed, clogging or the like is unlikely to occur in the production line, leading to an improved productivity.

The polymeric organic compound according to the present embodiment is a polyalkylene oxide having a viscosity average molecular weight of 150,000 or more (hereinafter, a first polyalkylene oxide). The polyalkylene oxide having such a high molecular weight is considered to prevent the metal compound powders having been dispersed by the dispersant, from coming closer again to each other, thereby to stabilize them in a dispersed state. In addition, the first polyalkylene oxide has oxygen atoms, which are considered to be coordinated to the metals contained in the metal compounds. By such an action of the first polyalkylene oxide, even when the metal compound has a high specific gravity and a large particle diameter, the settling thereof can be suppressed. Furthermore, the addition of the first polyalkylene oxide can increase the viscosity of the slurry. This also contributes to suppress the settling of the metal compound and allow the metal compounds to be dispersed stably.

The first polyalkylene oxide, which is an organic material mainly composed of carbon, hydrogen and oxygen, is removed during the process of producing a metal composite oxide (specifically, in a baking step). Therefore, the addition of the first polyalkylene oxide has little influence on the characteristics of the metal complex oxide obtained as a final product.

The production method according to the present embodiment will be described below by each step.

(1) Slurry Preparing Step

Powders of different kinds of metal compounds, a dispersion medium, a dispersant, and a first polyalkylene oxide are mixed. In view of further enhancing the uniformity, the above raw materials may be mixed using a planetary ball mill, a bead mill, a media-less mill, or the like. The media used in a planetary ball mill and a bead mill includes, for example, alumina beads, zirconia beads, and silicon nitride beads. The size of the media may be 0.1 mm or more and 5 mm or less. The sequence of mixing is not specifically limited. For example, the materials other than the metal compounds may be added first to a dispersion medium, and then, the metal compounds may be added.

The slurry prepared in this step may have any viscosity. The viscosity of the slurry as measured using a B-type viscometer under the conditions of a temperature of 23° C. to 27° C. and a rotation rate of 60 rpm is preferably 10 mPa·s or more. When the viscosity of the slurry is below 10 mPa·s, the settling of the metal compound is difficult to be suppressed, and a precipitate may be formed. The viscosity of the slurry as measured by the above method is more preferably 12 mPa·s or more, further more preferably 15 mPa·s or more.

The viscosity of the slurry as measured by the above method is preferably 2000 mPa·s or less. When the viscosity of the slurry exceeds 2000 mPa·s, the slurry tends to be less easy to handle in the steps subsequent to the mixing step, for example, feeding of the slurry to the next step becomes difficult. The viscosity of the slurry as measured by the above method is more preferably 1800 mPa·s or less, further more preferably 1200 mPa·s or less. Especially when the viscosity of the slurry as measured by the above method is 1000 mPa·s or less, the slurry can be easily spray-dried.

In short, the slurry having a viscosity in the above range is moderately viscous. Therefore, the settling of the metal compound is less likely to occur, and the slurry is excellent in ease of handling. Furthermore, the slurry having a viscosity in the above range is easy to stir, and the metal compounds dispersed in the slurry can be easily prevented from getting aggregated during stirring. The above viscosity is measured in accordance with JIS Z 8803.

The viscosity of the slurry as measured by the above method is, for example, 10 mPa·s or more and 2000 mPa·s or less.

(First Polyalkylene Oxide)

The first polyalkylene oxide has a viscosity average molecular weight of 150,000 or more. This can suppress the settling of a metal compound having a large specific gravity and a large particle diameter. Thus, different kinds of metal compounds are uniformly dispersed, and aggregation can be suppressed. Also, the formation of a precipitate can be suppressed. Even when a precipitate is formed, the precipitate is soft to a degree that can be redispersed. On the other hand, when the viscosity average molecular weight of the first polyalkylene oxide is below 150,000, the settling of the metal compound cannot be effectively suppressed, and the dispersibility is lowered.

The upper limit of the viscosity average molecular weight of the first polyalkylene oxide is not specifically limited, but the viscosity average molecular weight of the first polyalkylene oxide is preferably 2,200,000 or less. When the viscosity average molecular weight of the first polyalkylene oxide exceeds 2,200,000, due to the excessively high viscosity, the slurry may be less easy to handle as mentioned above. The viscosity average molecular weight of the first polyalkylene oxide is more preferably 1,100,000 or less.

The viscosity average molecular weight (M) can be calculated using an intrinsic viscosity (η) of a polymer diluent solution determined using a capillary viscometer, from the following Mark-Houwink-Sakurada formula.

$$\eta = KM^{\alpha},$$

where K is the Flory-Fox constant, and a is a constant of 0.5 to 1. The intrinsic viscosity η can be measured in accordance with JIS K 7367.

The first polyalkylene oxide may be a polymer of a monomer represented by, for example, the following general formula:

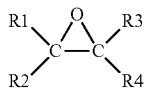

[Chem. 1]

In the formula, each of the R1 to R4 is independently hydrogen, an aliphatic hydrocarbon group having one to four carbon atoms, of the like.

The first polyalkylene oxide may be a copolymer of different kinds of the above monomers. The copolymer may be a random copolymer, a block copolymer, or a graft copolymer of the monomers.

Examples of the first polyalkylene oxide include polyethylene oxide, polypropylene oxide, and an addition polymer of ethylene oxide and propylene oxide. Preferred among them is polyethylene oxide.

The first polyalkylene oxide may be added in any amount, but in view of the viscosity and the suppression of settling, it is preferably added in an amount of 0.1 parts by mass or more per 100 parts by mass of the dispersion medium. When the adding amount of the first polyalkylene oxide is below 0.1 parts by mass per 100 parts by mass of the dispersion medium, the settling of the metal compounds is unlikely to be suppressed. The above adding amount of the first polyalkylene oxide is more preferably 0.2 parts by mass or more, more preferably 0.3 parts by mass or more.

The above adding amount of the first polyalkylene oxide is preferably 5 parts by mass or less per 100 parts by mass of the dispersion medium. When the above adding amount of the first polyalkylene oxide is above 5 parts by mass per 100 parts by mass of the dispersion medium, the viscosity may be excessively high. Consequently, the slurry may be less easy to handle as mentioned above. The above adding amount of the first polyalkylene oxide is more preferably 3 parts by mass or less.

The adding amount of the first polyalkylene oxide is, for example, 0.1 parts by mass or more and 5 parts by mass or less per 100 parts by mass of the dispersion medium.

In the case of using a polymeric organic compound other than the first polyalkylene oxide, a large amount needs to be added in order to suppressing the settling of the metal compounds in the slurry, which is not economical. Moreover, the polymeric organic compound will remain much in the raw material to be subjected to the subsequent baking step. Therefore, the polymeric organic compound is hardly thermally decomposed and may remain in the resultant metal oxide. Alternatively, carbon species are much produced when the polymeric organic compound is thermally decomposed, forming a reducing atmosphere, which may result in a failure of obtaining a desired metal oxide.

(Metal Compound)

The metal compound may be of any kind, examples of which include a hydroxide, an oxide, or a carbonate of a metal.

In the case of producing, for example, a metal composite oxide having a perovskite-type crystal structure represented by a general formula: $A1_{1-x}A2_xBO_{3-\delta}$, at least three kinds of metal compounds are used: a first compound containing the element A1, a second compound containing the element A2, and a third compound containing the element B.

The element A1 contained in the first compound is, for example, at least one of lanthanum (La) and samarium (Sm). Examples of the first compound include lanthanum carbonate ($La_2(CO_3)_3$), lanthanum hydroxide ($La(OH)_3$), lanthanum oxide ($La_2O_3$), samarium carbonate ($Sm_2(CO_3)_3$), samarium hydroxide ($Sm(OH)_3$), and samarium oxide ($Sm_2O_3$). According to the present embodiment, even a metal compound that quickly settles, like lanthanum carbonate, can be uniformly dispersed.

The element A2 contained in the second compound is at least one selected from the group consisting of calcium (Ca), strontium (Sr), and barium (Ba). Examples of the second compound include strontium carbonate ($SrCO_3$), strontium hydroxide ($Sr(OH)_2$), calcium carbonate ($CaCO_3$), calcium hydroxide ($Ca(OH)_2$), barium carbonate ($BaCO_3$), and barium hydroxide (($Ba(OH)_2$).

The element B contained in the third compound is, for example, at least one selected from the group consisting of manganese (Mn), iron (Fe), cobalt (Co), and nickel (Ni). Examples of the third compound include manganese oxide (e.g., $MnO_2$, $Mn_3O_4$), manganese carbonate ($MnCO_3$), iron oxide ($Fe_2O_3$), cobalt oxide ($Co_3O_4$), cobalt carbonate ($CoCO_3$), nickel oxide (NiO), and nickel carbonate ($NiCO_3$). According to the present embodiment, even a metal compound that quickly settles, like cobalt oxide, can be uniformly dispersed.

The element A1 preferably includes La. The content of La in the element A1 may be 90 atom % or more. The element A2 preferably includes Sr. The content of Sr in the element A2 may be 90 atom % or more. The x is not specifically limited.

The element B preferably includes at least one of Co and Fe. The content of Co or Fe in the element B may be 90 atom % or more. When the element B includes Co and Fe, the total content of them may be 90 atom % or more. In particular, the element B preferably includes Co and Fe.

Specifically, the metal composite oxide is exemplified by lanthanum strontium cobalt ferrite (LSCF, $La_{1-x1}Sr_{x1}Co_{1-y1}Fe_{y1}O_{3-\delta}$, where 0<x1<1 and 0<y1<1), lanthanum strontium manganite (LSM, $La_{i-x2}Sr_{x2}MnO_{3-\delta}$, where 0<x2<1), lanthanum strontium cobaltite (LSC, $La_{1-x3}Sr_{x3}CoO_{3-\delta}$, 0<x3<1), samarium strontium cobaltite (SSC, $Sm_{1-x4}Sr_{x4}CoO_{3-\delta}$, where 0<x4<1), and lanthanum strontium calcium manganite (LSCM, $La_{1-x5-y2}Sr_{x5}Ca_{y2}MnO_{3-\delta}$, where 0<x5<1 and 0<y2<1).

The total amount of the metal compounds is not specifically limited, but is preferably 100 parts by mass or more and 170 parts by mass or less per 100 parts by mass of the dispersion medium. According to the present embodiment, even when the metal compounds are contained at such a high concentration, they can be uniformly dispersed.

The average particle diameter of the metal compounds is also not specifically limited. According to the present embodiment, even when the different kinds of metal compounds have different average particle diameters, they can be uniformly dispersed. The average particle diameter of each of the metal compounds may be, for example, 0.5 μm or more and 50 μm or less, and may be 1 μm or more and 40 μm or less. The difference in average particle diameter between one kind of metal compound and another may be, for example, 20 μm or more, and may be 30 μm or more.

The average particle diameter is a particle diameter at 50% cumulative volume in a volumetric particle size distribution as measured by a laser diffractometry (this applies hereinafter).

The specific gravity of the metal compounds is also not specifically limited. According to the present embodiment, even when the different kinds of metal compounds have different specific gravities, they can be uniformly dispersed. The specific gravity of each of the metal compounds may be 1 g/cm$^3$ or more and 15 g/cm$^3$ or less, and may be 2 g/cm$^3$ or more and 9 g/cm$^3$ or less. The difference in specific gravity among the metal compounds may be, for example, 2 g/cm$^3$ or more, and may be 3 g/cm$^3$ or more.

(Dispersion Medium)

The dispersion medium is not specifically limited. In view of the ease of handling and the reduction of impurity amount, the dispersion medium may contain water (ion-exchanged water) as a major component (component occupying 50% or more of the whole mass), and is preferably composed only of water (ion-exchanged water).

(Dispersant)

The dispersant is not specifically limited, and may be any conventionally known dispersant.

When the dispersion medium contains water as a major component, the dispersant that can be used in this case include: an anionic dispersant, such as polycarboxylic acid salt, polyacrylic acid salt, naphthalenesulfonic acid formalin condensate salt, alkylsulfonic acid salt, and polyphosphoric acid salt; a nonionic dispersant, such as polyalkylene oxide other than the first polyalkylene oxide (viscosity average molecular weight: below 15,000) and polyoxyalkylene fatty acid ester; and a cationic dispersant, such as quaternary ammonium salt.

In particular, an anionic dispersant is desirable. In this case, the slurry tends to have a low viscosity, and the addition of the first polyalkylene oxide tends to be more effective. For example, a polyacrylic acid salt can be used. Examples of the cation forming a salt include a sodium ion, a potassium ion, a magnesium ion, an ammonium ion, and a calcium ion.

The molecular weight of the dispersant is not specifically limited, and may be set as appropriate according to the kind of the dispersion medium, the kinds, the particle diameters, and the like of the metal compounds to be dispersed.

The dispersant may be added in any amount, but in view of the dispersion effect, is preferably added in an amount of 0.5 parts by mass or more and 4 parts by mass or less per 100 parts by mass of the total of the metal compounds. The above adding amount of the dispersant is more preferably 1 part by mass or more and 3 parts by mass or less.

(2) Baking Step

After the resultant slurry is dried to remove the dispersion medium, the metal compounds are baked. This provides a metal composite oxide containing metals having been contained in the metal compounds.

The slurry may be dried by any method, such as a spray drying, hot-air drying, vacuum drying, and evaporation drying. The drying is preferably performed under such conditions that do not remove the first polyalkylene oxide. When the dispersion medium is ion-exchanged water, the first polyalkylene oxide is unlikely to be removed by the above method. Also, the drying is preferably completed before the uniformity of the slurry is not impaired. In this regard, a spray drying that can complete drying, for example, in several seconds is preferred. The drying temperature of the slurry may be, for example, 105° C. or higher and 200° C. or lower.

After the dispersion medium is removed, the first polyalkylene oxide preferably remains in the raw material immediately before baking. In this case, the aggregation of each metal compound is unlikely to occur, and the baking can proceed while the metal compounds are in a uniformly mixed state. Thus, a metal composite oxide having a desired composition can be obtained.

The baking may be performed at any temperature that is equal to or higher than a temperature at which the first polyalkylene oxide is thermally decomposed. In view of facilitating the thermal decomposition of the first polyalkylene oxide and the diffusion of each metal element, the heating temperature may be 1000° C. or higher, may be 1200° C. or higher, and may be 1400° C. or higher. The baking may be performed in any atmosphere as long as the first polyalkylene oxide is thermally decomposed and a metal composite oxide is obtained. The baking atmosphere may be, for example, an oxygen atmosphere, a nitrogen atmosphere, the air atmosphere, or a mixed atmosphere of oxygen and nitrogen.

FIG. 1 is a flowchart of an example of a production method according to the present embodiment.

First, a dispersant and a first polyalkylene oxide are added and dissolved in a dispersion medium (S1). Next, to the resultant solution, different kinds of metal compounds are added one after another or all at once (S2), and mixed in a wet process (S3). Thus, a slurry in which the metal compounds are uniformly dispersed in the dispersion medium is prepared. Subsequently, after the dispersion medium is removed (S4), the remaining metal compounds are baked (S5), to give a metal composite oxide.

[Metal Complex Oxide]

A metal composite oxide according to the present embodiment is represented by the following general formula:

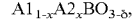

where the element A1 is at least one selected from the group consisting of La and Sm, the element A2 is at least one selected from the group consisting of Ca, Sr, and Ba, the element B is at least one selected from the group consisting of Mn, Fe, Co, and Ni, 0<x<1, and the δ is an oxygen deficiency amount. The metal composite oxide has a perovskite-type crystal structure.

In the metal composite oxide, the standard deviation of values determined at 10 random spots by dividing a molar concentration $M_A$ of a total of the element A1 and the element A2 (hereinafter sometimes referred to as an A-site element) by a molar concentration $M_B$ of the element B (hereinafter sometimes referred to as a B-site element) is 0.1 or less. An electrode formed by using such a metal composite oxide is excellent in adhesion to other layers.

The average particle diameter of the metal composite oxide is not specifically limited. When used as a material of an electrode for a solid oxide fuel cell, the metal composite oxide preferably has an average particle diameter of 5.0 μm or less, more preferably 4.0 μm or less. When the average particle diameter of the metal composite oxide is in this range, the above adhesion tends to be further improved. The average particle diameter of the metal composite oxide may be 0.1 μm or more.

The above metal composite oxide can be suitably used as a material of an electrode for a solid oxide fuel cell. The above metal composite oxide can be suitably used also for an electrode for an electrolysis cell (SOEC) utilizing a reverse reaction of a solid oxide fuel cell. Particularly, the above metal composite oxide can be suitably used as a material of an air electrode required to be highly electron conductive.

In fabricating a cell for a solid oxide fuel cell, a paste for an air electrode is applied to a solid electrolyte layer or an intermediate layer, and then baked. This allows the metal composite oxides contained in the paste to be sintered, forming an air electrode. In view of the power generation efficiency, the air electrode is required to be sufficiently in close contact with the solid electrolyte layer or the intermediate layer.

The adhesion between the air electrode and the solid electrolyte layer or the intermediate layer is influenced by the behavior of the metal composite oxides when sintered. Particularly, the variation in the ratio of the molar concentration of the A-site element to that of the B-site element (hereinafter, A/B ratio), that is, the standard deviation of the A/B ratio, has a great influence on the aforementioned adhesion.

The standard deviation of the A/B ratio can be determined as follows. First, the metal composite oxide particles are observed at a magnification of 3,000 times using a scanning electron microscope (SEM), to determine an observation field of view. Ten spots are chosen at random in the observation field of view, to measure the molar concentration of the A-site element and the B-site element, respectively, using an energy dispersive X-ray detector (EDS, e.g., INCA X-sight, available from Oxford Instruments). The measured molar concentration $M_A$ of the A-site element is divided by the molar concentration $M_B$ of the B-site element, to determine an A/B ratio in each spot. Lastly, a standard deviation of the 10 values of the A/B ratio is determined. When the A-site element includes two or more elements, the molar concentration $M_A$ is a molar concentration of the total of these A-site elements. When the B-site element includes two or more elements, the molar concentration $M_B$ is a molar concentration of the total of these B-site elements.

The above observation field of view possibly includes particles of different kinds of metal composite oxides. Therefore, the standard deviation of the A/B ratio determined by the above method reflects the variation in the A/B ratio between the particles. In addition, using a SEM, the detection can be made from the surface to the deep inside of the sample. Therefore, by employing SEM-EDS, much more information can be obtained on the particles. When the variation in the A/B ratio determined in such a way is small, the adhesion of the electrode layer formed by using the metal composite oxides to other layers can be particularly improved. The improved adhesion can be expected to lead to improvements in crack resistance and durability of the cell.

The standard deviation of the A/B ratio is preferably 0.09 or less, more preferably 0.08 or less.

The difference between the maximum and minimum values of the A/B ratio is also preferably small. The difference between the maximum and minimum values of the A/B ratio is, for example, 0.3 or less, and may be 0.29 or less. It is to be noted that even when the difference between the maximum and minimum values of the A/B ratio is 0.3 or less, the standard deviation of the A/B ratio is not necessarily equal to or less than 0.1. The difference between the maximum and minimum values of the A/B ratio is not always correlated to the standard deviation of the A/B ratio.

The above metal composite oxide can be produced by a production method according to the present embodiment. By improving the dispersibility of the constituent components in the raw material slurry, a metal composite oxide having a small variation in the A/B ratio, i.e., having a desired composition, can be obtained.

[Electrode for Solid Oxide Fuel Cell]

An electrode for a solid oxide fuel cell according to the present embodiment includes the above-described metal composite oxide according to the present embodiment. The electrode is particularly preferably used as an air electrode, since the metal composite oxide according to the present embodiment has a high electron conductivity.

An air electrode including the metal composite oxide according to the present embodiment is produced, for example, by applying a paste containing the metal composite oxide to a solid electrolyte layer or an intermediate layer, followed by baking. Since the metal composite oxide according to the present embodiment has a small variation in the A/B ratio, the air electrode including this metal composite oxide can be sufficiently in close contact with the solid electrolyte layer or the intermediate layer.

The present invention will be specifically described below with reference to Examples. The Examples, however, are not intended to limit the scope of the invention.

Example 1

First, 45 g of ion-exchanged water was put into a polypropylene pot with a capacity of 100 mL.

Into the polypropylene pot, a first polyalkylene oxide A (polyethylene oxide, PEO-1, available from Sumitomo Seika Chemicals Co., Ltd.) having a viscosity average molecular weight of 150,000 to 400,000 was added in an amount of 1.0 mass % relative to the ion-exchanged water, and stirred to dissolve therein.

Thereafter, an ammonium polyacrylate solution (Wako first grade, available from FUJIFILM Wako Pure Chemical Industries, Ltd.) was added as a dispersant in an amount of 2 mass % relative to the total amount of the following metal compounds.

Next, into the polypropylene pot, 22.45 g of lanthanum carbonate ($La_2(CO_3)_3$, available from Kanto Chemical Co., Inc., average particle diameter: 40 μm, specific gravity: 2.6 g/cm$^3$), 9.68 g of strontium carbonate ($SrCO_3$, available from FUJIFILM Wako Pure Chemical Industries, Ltd., average particle diameter: 2 μm, specific gravity: 3.7 g/cm$^3$), 2.58 g of cobalt oxide ($Co_3O_4$, available from FUJIFILM Wako Pure Chemical Industries, Ltd., average particle diameter: 3 μm, specific gravity: 6.1 g/cm$^3$), and 10.30 g of iron oxide ($Fe_2O_3$, available from FUJIFILM Wako Pure Chemical Industries, Ltd., average particle diameter: 1 μm, specific gravity: 5.24 g/cm$^3$) were added, and stirred.

Into the polypropylene pot, 45 ml of zirconia beads having a diameter of 1 mm were added, and they were mixed in a wet process using a planetary ball mill (P-5, available from Fritsch Co., Ltd.) at 210 rpm for three minutes. Then, the beads were removed, to give a slurry X1.

The slurry X1 was spray-dried using a spray dryer (exit temperature: 105° C.), to give a dry powder. Then, the dry powder was heated at 1400° C. for two hours in an electric furnace, to give a baked material. Thereafter, the baked material was crushed with an agate mortar, and then, passed through a sieve with a mesh size of 500 μm, to give metal composite oxide particles (LSCF, $La_{0.6}Sr_{0.4}Co_{0.2}Fe_{0.8}O_{3-\delta}$).

Example 2

A slurry X2 was prepared in the same manner as in Example 1, except that the first polyalkylene oxide A was added in an amount of 0.5 mass % relative to the ion-exchanged water.

The slurry X2 was subjected to spray-drying and baking in the same manner as in Example 1, to give metal composite oxide particles.

Example 3

A slurry X3 was prepared in the same manner as in Example 1, except that a first polyalkylene oxide B (polyethylene oxide, PEO-2, available from Sumitomo Seika Chemicals Co., Ltd.) having a viscosity average molecular weight of 400,000 to 600,000 was used.

The slurry X3 was subjected to spray-drying and baking in the same manner as in Example 1, to give metal composite oxide particles.

Example 4

A slurry X4 was prepared in the same manner as in Example 1, except that the first polyalkylene oxide B was added in an amount of 0.5 mass % relative to the ion-exchanged water.

The slurry X4 was subjected to spray-drying and baking in the same manner as in Example 1, to give metal composite oxide particles.

Example 5

A slurry X5 was prepared in the same manner as in Example 1, except that a first polyalkylene oxide C (polyethylene oxide, PEO-3, available from Sumitomo Seika Chemicals Co., Ltd.) having a viscosity average molecular weight of 600,000 to 1,100,000 was in an amount of 5.0 mass % relative to the ion-exchanged water.

The slurry X5 was evaporation-dried by heating to 110° C., to give a dry powder, and the resultant dry powder was baked in the same manner as in Example 1, to give metal composite oxide particles.

Example 6

A slurry X6 was prepared in the same manner as in Example 1, except that the first polyalkylene oxide C was added in an amount of 3.0 mass % relative to the ion-exchanged water.

The slurry X6 was subjected to spray-drying and baking in the same manner as in Example 1, to give metal composite oxide particles.

Example 7

A slurry X7 was prepared in the same manner as in Example 1, except that the first polyalkylene oxide C was added in an amount of 1.4 mass % relative to the ion-exchanged water.

The slurry X7 was subjected to spray-drying and baking in the same manner as in Example 1, to give metal composite oxide particles.

Example 8

A slurry X8 was prepared in the same manner as in Example 1, except that the first polyalkylene oxide C was added in an amount of 1.2 mass % relative to the ion-exchanged water.

The slurry X8 was subjected to spray-drying and baking in the same manner as in Example 1, to give metal composite oxide particles.

Example 9

A slurry X9 was prepared in the same manner as in Example 1, except that the first polyalkylene oxide C was added in an amount of 1.0 mass % relative to the ion-exchanged water.

The slurry X9 was subjected to spray-drying and baking in the same manner as in Example 1, to give metal composite oxide particles.

Example 10

A slurry X10 was prepared in the same manner as in Example 1, except that the first polyalkylene oxide C was added in an amount of 0.75 mass % relative to the ion-exchanged water.

The slurry X10 was subjected to spray-drying and baking in the same manner as in Example 1, to give metal composite oxide particles.

Example 11

A slurry X11 was prepared in the same manner as in Example 1, except that the first polyalkylene oxide C was added in an amount of 0.5 mass % relative to the ion-exchanged water.

The slurry X11 was subjected to spray-drying and baking in the same manner as in Example 1, to give metal composite oxide particles.

Example 12

A slurry X12 was prepared in the same manner as in Example 1, except that the first polyalkylene oxide C was added in an amount of 0.3 mass % relative to the ion-exchanged water.

The slurry X12 was subjected to spray-drying and baking in the same manner as in Example 1, to give metal composite oxide particles.

Example 13

A slurry X13 was prepared in the same manner as in Example 1, except that the first polyalkylene oxide C was added in an amount of 0.1 mass % relative to the ion-exchanged water.

The slurry X13 was subjected to spray-drying and baking in the same manner as in Example 1, to give metal composite oxide particles.

Example 14

A slurry X14 was prepared in the same manner as in Example 1, except that a first polyalkylene oxide D (polyethylene oxide, PEO-4, available from Sumitomo Seika Chemicals Co., Ltd.) having a viscosity average molecular weight of 1,100,000 to 1,500,000 was in an amount of 3.2 mass % relative to the ion-exchanged water.

The slurry X14 was evaporation-dried by heating to 110° C., and the resultant dry powder was baked in the same manner as in Example 1, to give metal composite oxide particles.

Example 15

A slurry X15 was prepared in the same manner as in Example 1, except that the first polyalkylene oxide D was added in an amount of 3.0 mass % relative to the ion-exchanged water.

The slurry X15 was evaporation-dried by heating to 110° C., and the resultant dry powder was baked in the same manner as in Example 1, to give metal composite oxide particles.

Example 16

A slurry X16 was prepared in the same manner as in Example 1, except that the first polyalkylene oxide D was added in an amount of 2.5 mass % relative to the ion-exchanged water.

The slurry X16 was subjected to spray-drying and baking in the same manner as in Example 1, to give metal composite oxide particles.

Example 17

A slurry X17 was prepared in the same manner as in Example 1, except that a first polyalkylene oxide E (polyethylene oxide, PEO-8, available from Sumitomo Seika Chemicals Co., Ltd.) having a viscosity average molecular weight of 1,700,000 to 2,200,000 was in an amount of 1.7 mass % relative to the ion-exchanged water.

The slurry X17 was evaporation-dried by heating to 110° C., and the resultant dry powder was baked in the same manner as in Example 1, to give metal composite oxide particles.

Example 18

A slurry X18 was prepared in the same manner as in Example 1, except that the first polyalkylene oxide E was added in an amount of 1.5 mass % relative to the ion-exchanged water.

The slurry X18 was evaporation-dried by heating to 110° C., and the resultant dry powder was baked in the same manner as in Example 1, to give metal composite oxide particles.

Example 19

A slurry X19 was prepared in the same manner as in Example 1, except that the first polyalkylene oxide E was added in an amount of 1.0 mass % relative to the ion-exchanged water.

The slurry X19 was subjected to spray-drying and baking in the same manner as in Example 1, to give metal composite oxide particles.

Comparative Example 1

A slurry Y1 was prepared in the same manner as in Example 1, except that no first polyalkylene oxide was added.

The slurry Y1 was subjected to spray-drying and baking in the same manner as in Example 1, to give metal composite oxide particles.

Comparative Example 2

First, 45 g of ion-exchanged water was put into a glass pot with a capacity of 100 mL.

Into the glass pot, a gelatin (APH-250, available from Nitta Gelatin Inc.) was added in an amount of 1.0 mass % relative to the ion-exchanged water, and stirred at room temperature for 30 minutes. The ion-exchanged water was heated under stirring to about 50° C., to dissolve the gelatin. Then, the stirring was stopped, and the glass pot was allowed to stand to cool down to room temperature.

The aqueous gelatin solution was transferred into a polypropylene container with a capacity of 100 mL. Into the polypropylene container, the dispersant and the metal compounds were added in the same manner as in Example 1, to prepare a slurry Y2.

The slurry Y2 was subjected to spray-drying and baking in the same manner as in Example 1, to give metal composite oxide particles.

Comparative Example 3

A slurry Y3 was prepared in the same manner as in Comparative Example 2, except that the gelatin was added in an amount of 0.5 mass % relative to the ion-exchanged water.

The slurry Y3 was subjected to spray-drying and baking in the same manner as in Example 1, to give metal composite oxide particles.

Comparative Example 4

A slurry Y4 was prepared in the same manner as in Example 1, except that a methyl cellulose (METOLOSE, available from Shin-Etsu Chemical Co., Ltd.) was used in place of the first polyalkylene oxide.

The slurry Y4 was subjected to spray-drying and baking in the same manner as in Example 1, to give metal composite oxide particles.

Comparative Example 5

A slurry Y5 was prepared in the same manner as in Comparative Example 4, except that the methyl cellulose was added in an amount of 0.5 mass % relative to the ion-exchanged water.

The slurry Y5 was subjected to spray-drying and baking in the same manner as in Example 1, to give metal composite oxide particles.

Comparative Example 6

A slurry Y6 was prepared in the same manner as in Example 1, except that a polyvinylpyrrolidone (K-30, available from Nippon Shokubai Co., Ltd.) was used in place of the first polyalkylene oxide A.

The slurry Y6 was subjected to spray-drying and baking in the same manner as in Example 1, to give metal composite oxide particles.

Comparative Example 7

A slurry Y7 was prepared in the same manner as in Comparative Example 6, except that the polyvinylpyrrolidone was added in an amount of 0.5 mass % relative to the ion-exchanged water.

The slurry Y7 was subjected to spray-drying and baking in the same manner as in Example 1, to give metal composite oxide particles.

Comparative Example 8

A slurry Y8 was prepared in the same manner as in Example 1, except that a polyvinyl alcohol (available from FUJIFILM Wako Pure Chemical Industries, Ltd., degree of saponification: 78 to 82 mol %, average degree of polymerization: 1,500 to 1,800) was used in place of the first polyalkylene oxide A.

The slurry Y8 was subjected to spray-drying and baking in the same manner as in Example 1, to give metal composite oxide particles.

Comparative Example 9

A slurry Y9 was prepared in the same manner as in Comparative Example 8, except that the polyvinyl alcohol was added in an amount of 0.5 mass % relative to the ion-exchanged water.

The slurry Y9 was subjected to spray-drying and baking in the same manner as in Example 1, to give metal composite oxide particles.

Comparative Example 10

A slurry Y10 was prepared in the same manner as in Example 1, except that a polyalkylene oxide having a viscosity average molecular weight of below 150,000 (polyethylene glycol, product made in FUJIFILM Wako Pure Chemical Industries, Ltd., average molecular weight: 20,000) was used in place of the first polyalkylene oxide A, and added in an amount of 2.0 mass % relative to the ion-exchanged water.

The slurry Y10 was subjected to spray-drying and baking in the same manner as in Example 1, to give metal composite oxide particles.

Comparative Example 11

A slurry Y11 was prepared in the same manner as in Comparative Example 10, except that the polyethylene glycol was added in an amount of 1.0 mass % relative to the ion-exchanged water.

The slurry Y11 was subjected to spray-drying and baking in the same manner as in Example 1, to give metal composite oxide particles.

Comparative Example 12

A slurry Y12 was prepared in the same manner as in Comparative Example 10, except that the polyethylene glycol was added in an amount of 0.5 mass % relative to the ion-exchanged water.

The slurry Y12 was subjected to spray-drying and baking in the same manner as in Example 1, to give metal composite oxide particles.

[Evaluation]

The slurries X1 to X19 and Y1 to Y12 were evaluated in the following manner. The results are shown in Tables 1 and 2. The adding amount in the tables represents the mass of a polymeric organic compound per 100 parts by mass of the dispersion medium.

(1) Viscosity Measurement of Slurry

The viscosity of each slurry was measured using a B-type viscometer (BM type, available from Tokyo Keiki Inc.) at a temperature of 23 to 27° C. and a rotational rate of 60 rpm. For the viscosity measurement of the slurries X5 and X14 to X18, a No. 3 rotor was used, and for that of the other slurries, a No. 2 rotor was used.

(2) Precipitation Suppression

Thirty milliliters of each slurry was put into a 30-ml-capacity test tube, and left to stand for one day. Thereafter, the height of the precipitate was measured. The precipitate was pressed with a glass rod, and rated according to the following criteria.

Excellent: The height of the precipitate was below 3 mm.

Good: The height of the precipitate was 3 mm or more, but the precipitate was soft and easily dissolved by the glass rod.

Poor[*1]: The height of the precipitate was below 3 mm, but the metal compounds were not dispersed uniformly in the slurry.

Poor[*2]: The height of the precipitate was 3 mm or more and below 10 mm, and the precipitate was hard so as not to be dissolved by the glass rod.

Bad: The height of the precipitate was 10 mm or more, and the precipitate was hard so as not to be dissolved by the glass rod.

TABLE 1

| | Polymeric organic compound | | Slurry | |
|---|---|---|---|---|
| Slurry | Name of material | Adding amount (parts by mass) | viscosity (mPa · s) | Precipitation suppression |
| X1 | Polyethylene oxide A | 1 | 30 | Excellent |
| X2 | | 0.5 | 20 | Excellent |
| X3 | Polyethylene oxide B | 1 | 41 | Excellent |
| X4 | | 0.5 | 25 | Excellent |
| X5 | Polyethylene oxide C | 5 | 1587 | Excellent |
| X6 | | 3 | 450 | Excellent |
| X7 | | 1.4 | 101 | Excellent |
| X8 | | 1.2 | 80 | Excellent |
| X9 | | 1 | 66 | Excellent |
| X10 | | 0.75 | 48 | Excellent |
| X11 | | 0.5 | 29 | Excellent |
| X12 | | 0.3 | 18 | Excellent |
| X13 | | 0.1 | 13 | Good |
| X14 | Polyethylene oxide D | 3.2 | 1560 | Excellent |
| X15 | | 3 | 1180 | Excellent |
| X16 | | 2.5 | 683 | Excellent |
| X17 | Polyethylene oxide E | 1.7 | 1743 | Excellent |
| X18 | | 1.5 | 1170 | Excellent |
| X19 | | 1 | 310 | Excellent |

TABLE 2

| | Polymeric organic compound | | Slurry | |
|---|---|---|---|---|
| Slurry | Name of material | Adding amount (parts by mass) | viscosity (mPa · s) | Precipitation suppression |
| Y1 | None | — | 12 | Bad |
| Y2 | Gelatin | 1 | 13 | Bad |
| Y3 | | 0.5 | 13 | Bad |
| Y4 | Methyl cellulose | 1 | 14 | Poor[*2] |
| Y5 | | 0.5 | 17 | Poor[*2] |
| Y6 | Polyvinylpyrrolidone | 1 | 12 | Bad |
| Y7 | | 0.5 | 11 | Bad |
| Y8 | Polyvinyl alcohol | 1 | 18 | Poor[*1] |
| Y9 | | 0.5 | 13 | Bad |
| Y10 | Polyethylene glycol | 2 | 13 | Poor[*2] |
| Y11 | | 1 | 13 | Poor[*2] |
| Y12 | | 0.5 | 9 | Poor[*2] |

Table 1 shows that in the slurries X1 to X19 in which the first polyalkylene oxide was added in an appropriate amount, the height of the precipitate was 3 mm or less, or a soft precipitate was formed. Especially in the slurries X1 to X4 and X7 to X13, the viscosity of the slurry was also suppressed low, and the ease of handling was excellent.

In contrast, in the slurry Y1 in which no polymeric organic compound was added, the height of the precipitate was 10 mm or more. In the slurries Y2 to Y7 and Y10 to Y12 in which a polymeric organic compound other than the first polyalkylene oxide was added, regardless of the amount added, the height of the precipitate was 3 mm or more, and a hard precipitate was formed. When such a large amount of hard precipitate is formed, a metal composite oxide having a desired composition is difficult to obtain. Of the slurries Y8 and Y9 in which a polyvinyl alcohol was added, in the slurry Y8 in which it was added in a larger amount, the precipitation was somewhat suppressed, but the metal compounds were not dispersed uniformly. With such a slurry, a metal composite oxide having a desired composition is difficult to obtain.

Example 20

A slurry X20 was prepared in the same manner as in Example 6.

The slurry X20 was spray-dried using a spray dryer (exit temperature: 105° C.), to give a dry powder. Then, the dry powder was heated at 1400° C. for two hours in an electric furnace, to give a baked material. Thereafter, the baked material was crushed with an agate mortar, and then, passed through a sieve with a mesh size of 500 μm, to give metal composite oxide particles (LSCF, $La_{0.6}Sr_{0.4}Co_{0.2}Fe_{0.8}O_{3-\delta}$).

The metal composite oxide particles were put into a polypropylene pot. With 45 ml of zirconia beads having a diameter of 3 mm further put into the pot, pulverization was performed for 10 minutes using a planetary ball mill (P-5, available from Fritsch Co., Ltd.). Thereafter, the beads were removed, and the resultant slurry was spray-dried using a spray dryer (exit temperature: 105° C.), to give a dry powder A1. The particle diameter $D_{50}$ of the dry powder A1 as measured by a laser diffraction-type particle size distribution analyzer (MT-3300EX II, available from MicrotracBEL Corp.) was 4.0 μm.

Example 21

First, 45 g of ion-exchanged water was put into a polypropylene pot with a capacity of 100 mL.

Into the polypropylene pot, the first polyalkylene oxide C was added in an amount of 1.5 mass % relative to the ion-exchanged water, and stirred to dissolve therein.

Thereafter, an ammonium polyacrylate solution (Wako first grade, available from FUJIFILM Wako Pure Chemical Industries, Ltd.) was added as a dispersant in an amount of 2 mass % relative to the total amount of the following metal compounds.

Next, into the polypropylene pot, 22.32 g of lanthanum carbonate ($La_2(CO_3)_3$, available from Kanto Chemical Co., Inc., average particle diameter: 40 μm, specific gravity: 2.6 g/cm$^3$), 9.5 g of strontium carbonate ($SrCO_3$, available from FUJIFILM Wako Pure Chemical Industries, Ltd., average particle diameter: 2 μm, specific gravity: 3.7 g/cm$^3$), and 12.8 g of cobalt oxide ($Co_3O_4$, available from FUJIFILM Wako Pure Chemical Industries, Ltd., average particle diameter: 3 μm, specific gravity: 6.1 g/cm$^3$) were added, and stirred.

Into the polypropylene pot, 45 ml of zirconia beads having a diameter of 1 mm were added, and they were mixed in a wet process using a planetary ball mill (P-5, available from Fritsch Co., Ltd.) at 210 rpm for three minutes. Then, the beads were removed, to give a slurry X21.

The slurry X21 was spray-dried using a spray dryer (exit temperature: 105° C.), to give a dry powder. Then, the dry powder was heated at 1300° C. for two hours in an electric furnace, to give a baked material. Thereafter, the baked material was crushed with an agate mortar, and then, passed through a sieve with a mesh size of 500 μm, to give metal composite oxide particles (LSC, $La_{0.6}Sr_{0.4}CoO_{3-\delta}$).

The metal composite oxide particles were put into a polypropylene pot. With 45 ml of zirconia beads having a diameter of 1 mm further put into the pot, pulverization was performed for 20 minutes using a planetary ball mill (P-5, available from Fritsch Co., Ltd.). Thereafter, the beads were removed, and the resultant slurry was spray-dried using a spray dryer (exit temperature: 105° C.), to give a dry powder A2. The particle diameter $D_{50}$ of the dry powder A2 as measured by a laser diffraction-type particle size distribution analyzer (MT-3300EX II, available from MicrotracBEL Corp.) was 1.0 μm.

Example 22

First, 45 g of ion-exchanged water was put into a polypropylene pot with a capacity of 100 mL.

Into the polypropylene pot, the first polyalkylene oxide B was added in an amount of 2 mass % relative to the ion-exchanged water, and stirred to dissolve therein.

Thereafter, an ammonium polyacrylate solution (Wako first grade, available from FUJIFILM Wako Pure Chemical Industries, Ltd.) was added as a dispersant in an amount of 2 mass % relative to the total amount of the following metal compounds.

Next, into the polypropylene pot, 20.53 g of lanthanum oxide ($La_2O_3$, available from FUJIFILM Wako Pure Chemical Industries, Ltd., average particle diameter: 20 μm, specific gravity: 6.5 g/cm$^3$), 4.64 g of strontium carbonate ($SrCO_3$, available from FUJIFILM Wako Pure Chemical Industries, Ltd., average particle diameter: 2 μm, specific gravity: 3.7 g/cm$^3$), and 18.13 g of manganese carbonate ($MnCO_3$, available from FUJIFILM Wako Pure Chemical Industries, Ltd., average particle diameter: 10 μm, specific gravity: 3.1 g/cm$^3$) were added, and stirred.

Into the polypropylene pot, 45 ml of zirconia beads having a diameter of 1 mm were added, and they were mixed in a wet process using a planetary ball mill (P-5, available from Fritsch Co., Ltd.) at 210 rpm for three minutes. Then, the beads were removed, to give a slurry X22.

The slurry X22 was spray-dried using a spray dryer (exit temperature: 105° C.), to give a dry powder. Then, the dry powder was heated at 1100° C. for two hours in an electric furnace, to give a baked material. Thereafter, the baked material was crushed with an agate mortar, and then, passed through a sieve with a mesh size of 500 μm, to give metal composite oxide particles (LSM, $La_{0.8}Sr_{0.2}MnO_{3-\delta}$).

The metal composite oxide particles were put into a polypropylene pot. With 45 ml of zirconia beads having a diameter of 1 mm further put into the pot, pulverization was performed for 50 minutes using a planetary ball mill (P-5, available from Fritsch Co., Ltd.). Thereafter, the beads were removed, and the resultant slurry was spray-dried using a spray dryer (exit temperature: 105° C.), to give a dry powder A3. The particle diameter $D_{50}$ of the dry powder A3 as measured by a laser diffraction-type particle size distribution analyzer (MT-3300EX II, available from MicrotracBEL Corp.) was 1.0 μm.

Example 23

First, 45 g of ion-exchanged water was put into a polypropylene pot with a capacity of 100 mL.

Into the polypropylene pot, the first polyalkylene oxide C was added in an amount of 2.0 mass % relative to the ion-exchanged water, and stirred to dissolve therein.

Thereafter, an ammonium polyacrylate solution (Wako first grade, available from FUJIFILM Wako Pure Chemical Industries, Ltd.) was added as a dispersant in an amount of 2 mass % relative to the total amount of the following metal compounds.

Next, into the polypropylene pot, 16.96 g of lanthanum oxide ($La_2O_3$, available from FUJIFILM Wako Pure Chemical Industries, Ltd., average particle diameter: 20 μm, specific gravity: 6.5 g/cm$^3$), 4.67 g of nickel oxide (NiO, available from FUJIFILM Wako Pure Chemical Industries, Ltd., average particle diameter: 2 μm, specific gravity: 6.67 g/cm$^3$), and 3.33 g of iron oxide ($Fe_2O_3$, available from FUJIFILM Wako Pure Chemical Industries, Ltd., average particle diameter: 1 μm, specific gravity: 5.24 g/cm$^3$) were added, and stirred.

Into the polypropylene pot, 45 ml of zirconia beads having a diameter of 1 mm were added, and they were mixed in a wet process using a planetary ball mill (P-5, available from Fritsch Co., Ltd.) at 210 rpm for three minutes. Then, the beads were removed, to give a slurry X23.

The slurry X23 was spray-dried using a spray dryer (exit temperature: 105° C.), to give a dry powder. Then, the dry powder was heated at 1200° C. for two hours in an electric furnace, to give a baked material. Thereafter, the baked material was crushed with an agate mortar, and then, passed through a sieve with a mesh size of 500 μm, to give metal composite oxide particles (LNF, $LaNi_{0.6}Fe_{0.4}O_{3-\delta}$).

The metal composite oxide particles were put into a polypropylene pot. With 45 ml of zirconia beads having a diameter of 1 mm further put into the pot, pulverization was performed for 50 minutes using a planetary ball mill (P-5, available from Fritsch Co., Ltd.). Thereafter, the beads were removed, and the resultant slurry was spray-dried using a spray dryer (exit temperature: 105° C.), to give a dry powder A4 The particle diameter $D_{50}$ of the dry powder A4 as measured by a laser diffraction-type particle size distribution analyzer (MT-3300EX II, available from MicrotracBEL Corp.) was 1.0 μm.

Example 24

First, 45 g of ion-exchanged water was put into a polypropylene pot with a capacity of 100 mL.

Into the polypropylene pot, the first polyalkylene oxide B was added in an amount of 2 mass % relative to the ion-exchanged water, and stirred to dissolve therein.

Thereafter, an ammonium polyacrylate solution (Wako first grade, available from FUJIFILM Wako Pure Chemical Industries, Ltd.) was added as a dispersant in an amount of 2 mass % relative to the total amount of the following metal compounds.

Next, into the polypropylene pot, 14.53 g of lanthanum oxide ($La_2O_3$, available from FUJIFILM Wako Pure Chemical Industries, Ltd., average particle diameter: 20 μm, specific gravity: 6.5 g/cm$^3$), 6.59 g of strontium carbonate ($SrCO_3$, available from FUJIFILM Wako Pure Chemical Industries, Ltd., average particle diameter: 2 μm, specific gravity: 3.7 g/cm$^3$), 4.47 g of calcium carbonate ($CaCO_3$, product made in FUJIFILM Wako Pure Chemical Industries, Ltd., average particle diameter: 2 μm, specific gravity: 2.8 g/cm$^3$), and 20.5 g of manganese carbonate ($MnCO_3$, product made in FUJIFILM Wako Pure Chemical Industries, Ltd., average particle diameter: 10 μm, specific gravity: 3.1 g/cm$^3$) were added, and stirred.

Into the polypropylene pot, 45 ml of zirconia beads having a diameter of 1 mm were added, and they were mixed in a wet process using a planetary ball mill (P-5, available from Fritsch Co., Ltd.) at 210 rpm for three minutes. Then, the beads were removed, to give a slurry X24.

The slurry X24 was spray-dried using a spray dryer (exit temperature: 105° C.), to give a dry powder. Then, the dry powder was heated at 1400° C. for two hours in an electric furnace, to give a baked material. Thereafter, the baked material was crushed with an agate mortar, and then, passed through a sieve with a mesh size of 500 μm, to give metal composite oxide particles (LSCM, $La_{0.5}Sr_{0.25}Ca_{0.25}MnO_{3-\delta}$).

The metal composite oxide particles were pulverized using a supersonic jet mill (available from Nippon Pneumatic Mfg. Co., Ltd.) at a milling pressure of 0.6 MPa and a feeding rate of 10 g/min, to give a dry powder A5. The particle diameter $D_{50}$ of the dry powder A5 as measured by a laser diffraction-type particle size distribution analyzer (MT-3300EX II, available from MicrotracBEL Corp.) was 3.0 μm.

Comparative Example 13

A slurry Y13 was prepared in the same manner as in Example 20, except that no first polyalkylene oxide was added.

The slurry Y13 was subjected to spray-drying, baking, and pulverization in the same manner as in Example 20, to give a dry powder B1. The particle diameter $D_{50}$ of the dry powder B1 as measured by a laser diffraction-type particle size distribution analyzer (MT-3300EX II, available from MicrotracBEL Corp.) was 3.9 μm.

Comparative Example 14

A slurry Y14 was prepared in the same manner as in Example 21, except that no first polyalkylene oxide was added.

The slurry Y14 was subjected to spray-drying, baking, and pulverization in the same manner as in Example 21, to give a dry powder B2. The particle diameter $D_{50}$ of the dry powder B2 as measured by a laser diffraction-type particle size distribution analyzer (MT-3300EX II, available from MicrotracBEL Corp.) was 2.3 μm.

Comparative Example 15

A slurry Y15 was prepared in the same manner as in Example 22, except that no first polyalkylene oxide was added.

The slurry Y15 was subjected to spray-drying, baking, and pulverization in the same manner as in Example 22, to give a dry powder B3. The particle diameter $D_{50}$ of the dry powder B3 as measured by a laser diffraction-type particle size distribution analyzer (MT-3300EX II, available from MicrotracBEL Corp.) was 1.0 μm.

Comparative Example 16

A slurry Y16 was prepared in the same manner as in Example 23, except that no first polyalkylene oxide was added.

The slurry Y16 was subjected to spray-drying, baking, and pulverization in the same manner as in Example 23, to give a dry powder B4. The particle diameter $D_{50}$ of the dry powder B4 as measured by a laser diffraction-type particle size distribution analyzer (MT-3300EX II, available from MicrotracBEL Corp.) was 1.3 μm.

Comparative Example 17

A slurry Y17 was prepared in the same manner as in Example 24, except that no first polyalkylene oxide was added.

The slurry Y17 was subjected to spray-drying, baking, and pulverization in the same manner as in Example 24, to give a dry powder B5. The particle diameter $D_{50}$ of the dry powder B5 as measured by a laser diffraction-type particle size distribution analyzer (MT-3300EX II, available from MicrotracBEL Corp.) was 3.5 µm.

[Evaluation]

(1) Viscosity Measurement of Slurry

With respect to the slurries X20 to X24 and Y13 to Y17, the viscosity of each slurry was measured in a manner similar to the above, using a No. 3 rotor. The results are shown in Table 3.

(2) Precipitation Suppression

With respect to the slurries X20 to X24 and Y13 to Y17, the precipitate was measured for its height and evaluated in the same manner as above. The results are shown in Table 3.

(3) Standard Deviation of A/B Ratio

With respect to the dry powders A1 to A5 and B1 to B5, the standard deviation of the A/B ratio at 10 spots was determined in the following manner. The results are shown in Table 4.

The dry powder was observed at a magnification of 3000 times using a SEM, to determine an observation field of view. Ten spots are chosen at random in the observation field of view, to measure the molar concentration of the A-site element and the B-site element, respectively, using an energy dispersive X-ray detector (INCA X-sight, available from Oxford Instruments), under the conditions of an accelerating voltage of 15 kV and a process time of five. The measured overall molar concentration $M_A$ of the A-site element is divided by the overall molar concentration $M_B$ of the B-site element, to determine an A/B ratio in each spot. Lastly, a standard deviation of the A/B ratio measured at 10 spots was determined.

(4) Adhesion

The dry powders A1 to A5 and B1 to B5 were evaluated for the adhesion in the following manner. The results are shown in Table 4.

(i) Preparation of Paste for Air Electrode

First, 2.5 g of the dry powder, 2.25 g of ethyl cellulose (tradename "Ethyl Cellulose 45 mPa·s", available from Kishida Chemical Co., Ltd.), and 0.25 g of terpineol (α-terpineol, available from Kanto Chemical Co., Inc.) were put into a plastic cream container (UG cream container, capacity: 24 mL, available from Umano Kagaku Youki Kabushiki Gaisya). Then, the above cream container was set on a rotation-revolution mixer (Awatori Rentaro ARE-250, available from Thinky Corporation), and kneading was performed at a rotation frequency of 2000 rpm for three minutes, to give a paste for an air electrode.

(ii) Preparation of Paste for Intermediate Layer

First, 2.5 g of gadolinium doped ceria ($Gd_{0.1}Ce_{0.9}O_{1.95}$, available from Sigma-Aldrich Co. LLC.), 2.25 g of ethyl cellulose (tradename "Ethyl Cellulose 45 mPa·s", available from Kishida Chemical Co., Ltd.), and 0.25 g of terpineol (α-terpineol, available from Kanto Chemical Co., Inc.) were put into a plastic cream container (UG cream container, capacity: 24 mL, available from Umano Kagaku Youki Kabushiki Gaisya). Then, the above cream container was set on a rotation-revolution mixer (Awatori Rentaro ARE-250, available from Thinky Corporation), and kneading was performed at a rotation frequency of 2000 rpm for three minutes, to give a paste for an intermediate layer.

(iii) Production of Electrolyte Substrate

Two grams of yttria stabilized zirconium (TZ-8Y, available from Tosoh Corporation) was put into a round die of 20 mm in diameter. The round die was set in a biaxial compression molding machine, and molding was performed at a pressure of 100 MPa for one minute, to give a cylindrical molded body. The resultant molded body was baked in an electric furnace for five hours under the air atmosphere condition at 1400° C., to produce an electrolyte substrate.

(iv) Formation of Intermediate Layer

An intermediate layer paste was applied onto the electrolyte substrate using a screen mask (SUS, 300 mesh, diameter: 9 mm), and allowed to stand for 10 minutes at room temperature. Thereafter, the electrolyte substrate coated with the interlayer paste was dried in a dryer for 10 minutes at 110° C. Subsequently, the substrate was baked in an electric furnace for two hours under the air atmosphere condition at 1200° C. The intermediate layer paste was burned in a layer form onto the surface of the electrolyte substrate, so that a first laminate including an intermediate layer and the electrolyte substrate was formed.

(V) Formation of Air Electrode

An air electrode paste was applied onto the first laminate using a screen mask (SUS, 300 mesh, diameter: 9 mm) and allowed to stand for 10 minutes at room temperature. Thereafter, the first laminate coated with the air electrode paste was dried in a dryer for 10 minutes at 110° C. Subsequently, the first laminate was baked in an electric furnace for two hours under the air atmosphere condition at the following temperatures. The air electrode paste was burned in a layer form onto the surface of the first laminate, so that a second laminate including an air electrode, the intermediate layer, and the electrolyte substrate was formed. The baking temperature was set at 900° C. when the dry powders A1 and B1 (LSCF) were used. The baking temperature was set at 1000° C. when the dry powders A2 and B2 (LSC) were used, when the dry powders A3 and B3 (LSM) were used, and when the dry powders A4 and B4 (LNF) were used. The baking temperature was set at 950° C. when the dry powders A5 and B5 (LSCM) were used.

(vi) Evaluation of Adhesion

To the air electrode of the second laminate, a commercially available cellophane adhesive tape was affixed. The adhesive tape was pulled perpendicular to the surface of the air electrode and peeled off from the surface of the air electrode. The tape thus peeled off was visually inspected as to whether or not the air electrode was attaching thereto. The adhesion was rated as good when the area of the air electrode attaching to the tape was 5% or less of the area of the air electrode affixed to the tape. The adhesion was rated as poor when the area of the air electrode attaching to the tape was below 5% of the area of the air electrode affixed to the tape. The results are shown in Table 4.

TABLE 3

| | Polymeric organic compound | | Slurry | |
|---|---|---|---|---|
| Slurry | Name of material | Adding amount (parts by mass) | viscosity (mPa · s) | Precipitation suppression |
| X20 | Polyethylene oxide C | 3 | 450 | Excellent |
| X21 | Polyethylene oxide C | 1.5 | 160 | Excellent |
| X22 | Polyethylene oxide B | 2 | 110 | Excellent |
| X23 | Polyethylene oxide C | 2 | 220 | Excellent |
| X24 | Polyethylene oxide B | 2 | 90 | Excellent |

TABLE 3-continued

| | Polymeric organic compound | | Slurry | |
| Slurry | Name of material | Adding amount (parts by mass) | viscosity (mPa · s) | Precipitation suppression |
|---|---|---|---|---|
| Y13 | None | — | 12 | Bad |
| Y14 | | | 25 | Bad |
| Y15 | | | 21 | Poor*2 |
| Y16 | | | 28 | Poor*2 |
| Y17 | | | 15 | Poor*1 |

TABLE 4

| | | A/B ratio | | |
| Dry powder | Composition | Standard deviation | Difference between maximum and minimum values | Adhesion |
|---|---|---|---|---|
| A1 | LSCF | 0.07 | 0.24 | Good |
| A2 | LSC | 0.08 | 0.29 | Good |
| A3 | LSM | 0.02 | 0.06 | Good |
| A4 | LNF | 0.03 | 0.10 | Good |
| A5 | LSCM | 0.05 | 0.15 | Good |
| B1 | LSCF | 0.24 | 0.92 | Poor |
| B2 | LSC | 0.22 | 0.82 | Poor |
| B3 | LSM | 0.27 | 1.14 | Poor |
| B4 | LNF | 0.36 | 1.00 | Poor |
| B5 | LSCM | 0.11 | 0.32 | Poor |

[Evaluation Results]

As is clear from Table 3, in the slurries X20 to X24 in which the first polyalkylene oxide was added in an appropriate amount, the height of the precipitate was 3 mm or less, or a soft precipitate was formed. Especially in X21 to X24, the viscosity of the slurry was suppressed low, and the ease of handling was excellent.

Table 4 shows that the metal composite oxides A1 to A5 formed from the slurry prepared by adding the first polyalkylene oxide, the standard deviation of the A/B ratio was 0.10 or less. The difference between the maximum and minimum values of the A/B ratio was 0.30 or less. The foregoing indicates that the metal composite oxides A1 to A5 had a desired composition. Furthermore, the air electrodes produced by using these metal composite oxides A1 to A5 were excellent in adhesion to other layers.

INDUSTRIAL APPLICABILITY

A production method according to the present invention can provide a metal composite oxide having a desired composition, and therefore, is suitably applicable for production of various metal complex oxides.

A metal composite oxide according to the present invention has a desired composition. The electrode including the metal composite oxide is excellent in adhesion to other layers, and therefore, is suitably applicable as a material for an electrode in a solid oxide fuel cell.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A method for producing a metal composite oxide, the method comprising steps of:
preparing a slurry by mixing different kinds of metal compounds in a powder form, a dispersion medium, and a dispersant, and
baking the different kinds of metal compounds after the dispersion medium in the slurry is removed, wherein
the slurry further includes a polyalkylene oxide having a viscosity average molecular weight of 150,000 or more.

2. The method for producing a metal composite oxide according to claim 1, wherein the polyalkylene oxide is added in an amount of 0.1 parts by mass or more and 5 parts by mass or less per 100 parts by mass of the dispersion medium.

3. The method for producing a metal composite oxide according to claim 1, wherein the slurry has a viscosity of 10 mPa·s or more and 2000 mPa·s or less, the viscosity being measured using a B-type viscometer under conditions of a temperature of 23° C. to 27° C. and a rotation rate of 60 rpm.

4. The method for producing a metal composite oxide according to claim 1, wherein the viscosity average molecular weight of the polyalkylene oxide is 2,200,000 or less.

5. The method for producing a metal composite oxide according to claim 1, wherein the polyalkylene oxide is polyethylene oxide.

6. The method for producing a metal composite oxide according to claim 1, wherein the dispersant is anionic.

7. The method for producing a metal composite oxide according to claim 1, wherein the dispersant is added in an amount of 0.5 parts by mass or more and 4 parts by mass or less per 100 parts by mass of a total of the different kinds of metal compounds.

8. The method for producing a metal composite oxide according to claim 1, wherein the different kinds of metal compounds at least include: a metal compound containing at least one of lanthanum and samarium; a metal compound containing at least one selected from the group consisting of calcium, strontium, and barium; and a metal compound containing at least one selected from the group consisting of manganese, iron, cobalt, and nickel.

9. The method for producing a metal composite oxide according to claim 1, wherein a total amount of the different kinds of metal compounds is 100 parts by mass or more and 170 parts by mass or less per 100 parts by mass of the dispersion medium.

10. The method for producing a metal composite oxide according to claim 1, wherein the metal composite oxide is represented by a following general formula:

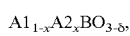

$A1_{1-x}A2_xBO_{3-\delta}$, where the element A1 is at least one selected from the group consisting of La and Sm, the element A2 is at least one selected from the group consisting of Ca, Sr, and Ba, the element B is at least one selected from the group consisting of Mn, Fe, Co, and Ni, 0<x<1, and the δ is an oxygen deficiency amount,
the metal composite oxide having a perovskite-type crystal structure.

11. A metal composite oxide, represented by a following general formula:

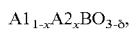

$A1_{1-x}A2_xBO_{3-\delta}$, where the element A1 is at least one selected from the group consisting of La and Sm, the element A2 is at least one selected from the group consisting of Ca, Sr, and Ba, the element B is at least one selected from the group consisting of Mn, Fe, Co, and Ni, 0<x<1, and the δ is an oxygen deficiency amount, the metal composite oxide having a perovskite-type crystal structure, wherein a standard deviation of values determined at 10 random spots by dividing a molar concentration $M_A$ of a total of the element A1 and the element A2 by a molar concentration $M_B$ of the element B is 0.1 or less.

12. The metal composite oxide according to claim 11, wherein a difference between maximum and minimum values obtained by dividing the molar concentration $M_A$ by the molar concentration $M_B$ is 0.3 or less.

13. An electrode for a solid oxide fuel cell, the electrode comprising the metal composite oxide of claim 11.

* * * * *